United States Patent
Orlik et al.

(10) Patent No.: US 8,520,791 B2
(45) Date of Patent: Aug. 27, 2013

(54) STTC ENCODER FOR SINGLE ANTENNA WAVE TRANSCEIVERS

(75) Inventors: Philip V. Orlik, Cambridge, MA (US); Lu Zhang, Newark, DE (US); Raymond Yim, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 362 days.

(21) Appl. No.: 12/503,507

(22) Filed: Jul. 15, 2009

(65) Prior Publication Data

US 2010/0246718 A1 Sep. 30, 2010

Related U.S. Application Data

(60) Provisional application No. 61/165,393, filed on Mar. 31, 2009.

(51) Int. Cl.
*H04L 7/00* (2006.01)
*H04L 12/28* (2006.01)
*G06F 12/00* (2006.01)

(52) U.S. Cl.
USPC ............................ 375/356; 370/258; 711/220

(58) Field of Classification Search
USPC .......................................... 375/356; 370/258
See application file for complete search history.

(56) References Cited

U.S. PATENT DOCUMENTS

| | | | | | |
|---|---|---|---|---|---|
| 3,037,700 | A | * | 6/1962 | Clapper | 708/130 |
| 3,297,997 | A | * | 1/1967 | Grady et al. | 711/220 |
| 3,297,998 | A | * | 1/1967 | Klein | 711/220 |
| 3,319,226 | A | * | 5/1967 | Mott et al. | 708/510 |
| 3,350,698 | A | * | 10/1967 | Pritchard, Jr. | 711/128 |
| 4,107,656 | A | * | 8/1978 | Farnsworth | 375/356 |
| 4,135,181 | A | * | 1/1979 | Bogacki et al. | 340/870.03 |
| 5,475,856 | A | * | 12/1995 | Kogge | 712/20 |
| 6,891,897 | B1 | * | 5/2005 | Bevan et al. | 375/265 |
| 7,103,008 | B2 | * | 9/2006 | Greenblat et al. | 370/258 |
| 2006/0198462 | A1 | * | 9/2006 | Lee et al. | 375/267 |
| 2007/0237262 | A1 | * | 10/2007 | Hwang et al. | 375/316 |
| 2008/0052497 | A1 | * | 2/2008 | Sueyoshi et al. | 712/221 |
| 2008/0075207 | A1 | * | 3/2008 | Hwang et al. | 375/346 |
| 2010/0153692 | A1 | * | 6/2010 | Kota et al. | 712/222 |

* cited by examiner

*Primary Examiner* — Chieh M Fan
*Assistant Examiner* — Sarah Hassan
(74) *Attorney, Agent, or Firm* — Dirk Brinkman; Gene Vinokur (57) ABSTRACT

An encoder in a transmitter uses space-time trellis coding. An input bitstream is multiplexed to produce in parallel a set of output bitstreams. A multiplier applies a code generating weight to each output bitstream, which are combined, mapped and transmitted by a single antenna.

2 Claims, 8 Drawing Sheets

64-state STTC encoder for $n$ ($n \geq 2$) transmit antennas

Fig 6 64-state STTC encoder for $n$ ($n \geq 2$) transmit antennas

STTC ENCODER FOR SINGLE ANTENNA WAVE TRANSCEIVERS

RELATED APPLICATIONS

This application related to non-provisional application Ser. No. 12/503,465 "Unified STTC Encoder for Wave Transceiver," filed by Philip V. Orlik et al on Jul. 15, 2009, co-filed herewith.

This application claims priority to the provisional application 61/165,393 filed by Philip V. Orlik on Mar. 31, 2009, and is incorporated herein.

FIELD OF THE INVENTION

This invention relates generally to transceivers, and more particularly to WAVE single antenna transceivers using space-time trellis codes.

BACKGROUND OF THE INVENTION

Wireless access in vehicular environments (WAVE) provides high-speed vehicle-to-vehicle, and vehicle-to-infrastructure data transmission. The physical (PHY) layer of a WAVE network is based on the IEEE 802.11p standard. Currently, a WAVE transceiver has one antenna, and uses convolutional forward error correction (FEC) coding.

To achieve spatial diversity and/or multiplexing gains, multiple-input-multiple-output (MIMO) techniques can be used, e.g., WiMAX. It is expected that MIMO will be considered for WAVE standards.

MIMO techniques include open-loop and closed-loop spatial multiplexing, closed-loop MIMO beamforming, and open-loop space-time coding (STC). In a dynamic WAVE networks, the estimated instantaneous channel state information (CSI) can quickly change because of the velocity of the vehicles. In addition, feeding back time-varying instantaneous CSI increases overhead. Thus, closed-loop MIMO techniques are not suitable for WAVE networks.

For open-loop MIMO techniques, STC includes space-time block codes (STBC), and space-time trellis codes (STTC). For STBC schemes, orthogonal STBC (OSTBC) is usually adopted by commercial wireless standards. If the channel is invariant within an OSTBC block, then a simple symbol-level maximum likelihood (ML) detection of OSTBC can achieve full spatial diversity.

In WiMAX, OSTBC is used as an inner code serially concatenated with a conventional convolutional code. Frequency offset resulting from imperfect frequency compensation can lead to symbol-level time-varying fading within an OSTBC block. In this case, to avoid performance degradation, block-level ML detection is needed to decode OSTBC so as to avoid performance degradation.

For complex modulation constellation, full-rate OSTBC only exists for multiple transmit antennas. STTC on the other hand, is a full-rate trellis coded modulation technique specifically designed only for multi-antenna transmission. The coding and decoding complexity is similar to traditional single-antenna trellis codes (e.g., convolutional codes) that have the same number of trellis states as STTC STTC has different design criteria for different channel conditions, such as "quasi-static vs. rapid" multipath fading based on the coherence time, and "flat vs. frequency-selective" multipath fading, based on the coherence bandwidth.

An STTC designed for a quasi-static flat fading channel can achieve at least the same end-to-end diversity benefit for other channel conditions, without modifications of the detection algorithm. Thus, unlike OSTBC, there exist STTC schemes which are robust to unpredictable/rapid variation of channel conditions. While most STBC schemes, e.g., OSTBC, do not provide coding gain, STTC does provide coding gain.

Conventional wireless standards, which consider single- and multi-antenna configurations, when evolving from the single-antenna configuration to the multi-antenna configuration, change the coding and/or decoding modules at the transceivers. This is because the structure and process of STC encoders and decoders have obvious differences from those of conventional single-antenna FEC techniques, e.g., convolutional codes, and turbo codes.

Because STTC is inherently a trellis coded modulation technique, using different modulation constellations requires that STTC encoders structures have different structures.

Convolutional Code in IEEE 802.11p Standard

Figure 1:
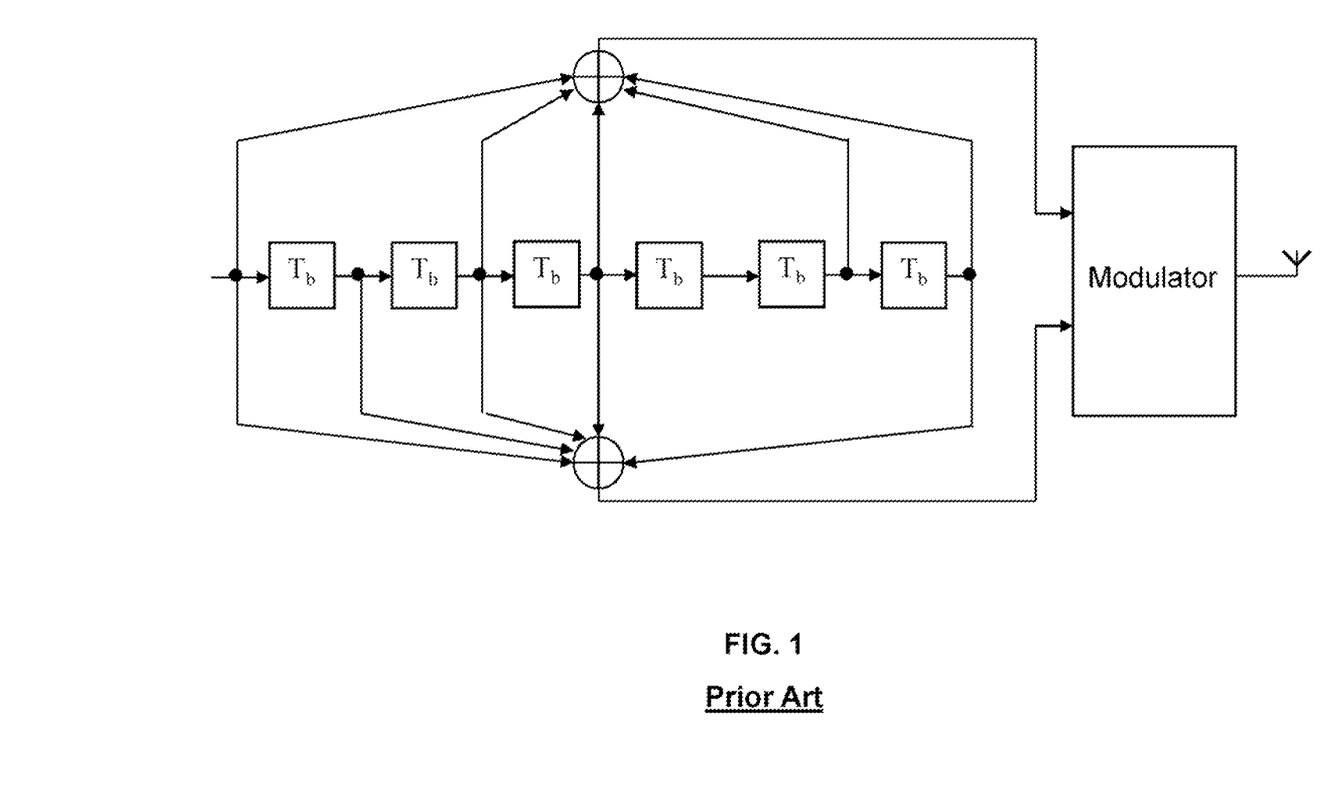
FIG. 1 is a graph of a conventional 64-state convolutional encoder prescribed in the IEEE 802.11p standard.

As shown in FIG. 1, a conventional 64-state convolutional encoder 100 according to the IEEE 802.11p standard uses a generator polynomials, $g_0=133_{oct}$ and $g_1=171_{oct}$, with a code rate $R_c=½$. In the encoder, each shift register 105 is a 1-bit (binary) register. The constraint length 102 of this code is seven. That is, the memory order is six and the number of trellis states is $2^6=64$. The input bits 101 are encoded into coded bits. Then, the modulator 110 takes coded bits and converts them into transmitted symbols. The Viterbi decoding is recommended for performing ML coherent detection.

Higher code rates (e.g., ⅔, ¾) can be achieved by puncturing. Puncturing is a procedure for omitting some of the encoded bits in the transmitter and inserting a dummy "zero" in the convolutional decoder in place of the omitted bits. The puncturing patterns are prescribed in the IEEE 802.11p standard. When puncturing is used, in order to reuse the original decoding trellis, the calculation of the branch metrics need to be modified appropriately.

STTC Designed for Multiple Transmit Antennas

The STTC designed for n ($n \geq 2$) transmit antennas is denoted as n-Tx STTC, at each time slot t, an n-Tx STTC encodes $k=\log_2 M$ bits into n coded MPSK/MQAM symbols $c_t=(c_t^1, c_t^2, \ldots, c_t^n)$. Antenna i transmits symbol $c_t^i$, and n coded symbols are transmitted simultaneously by n transmit antennas, resulting in full-rate transmission. The energy per information bit is $E_b$. Because n coded MPSK/MQAM symbols are generated from $k=\log_2 M$ information bits, the energy for each of the n coded symbols is $E_c=kE_b/n$.

ML coherent detection for STTC typically uses Viterbi decoding. Compared with the Viterbi decoding for one receive antenna, when there are m ($m \geq 2$) receive antennas, the branch metric is the sum of m values, each of which is obtained by using the received signal at one of m receive antennas to do the same calculation of branch metric as for one receive antenna.

Figure 2:
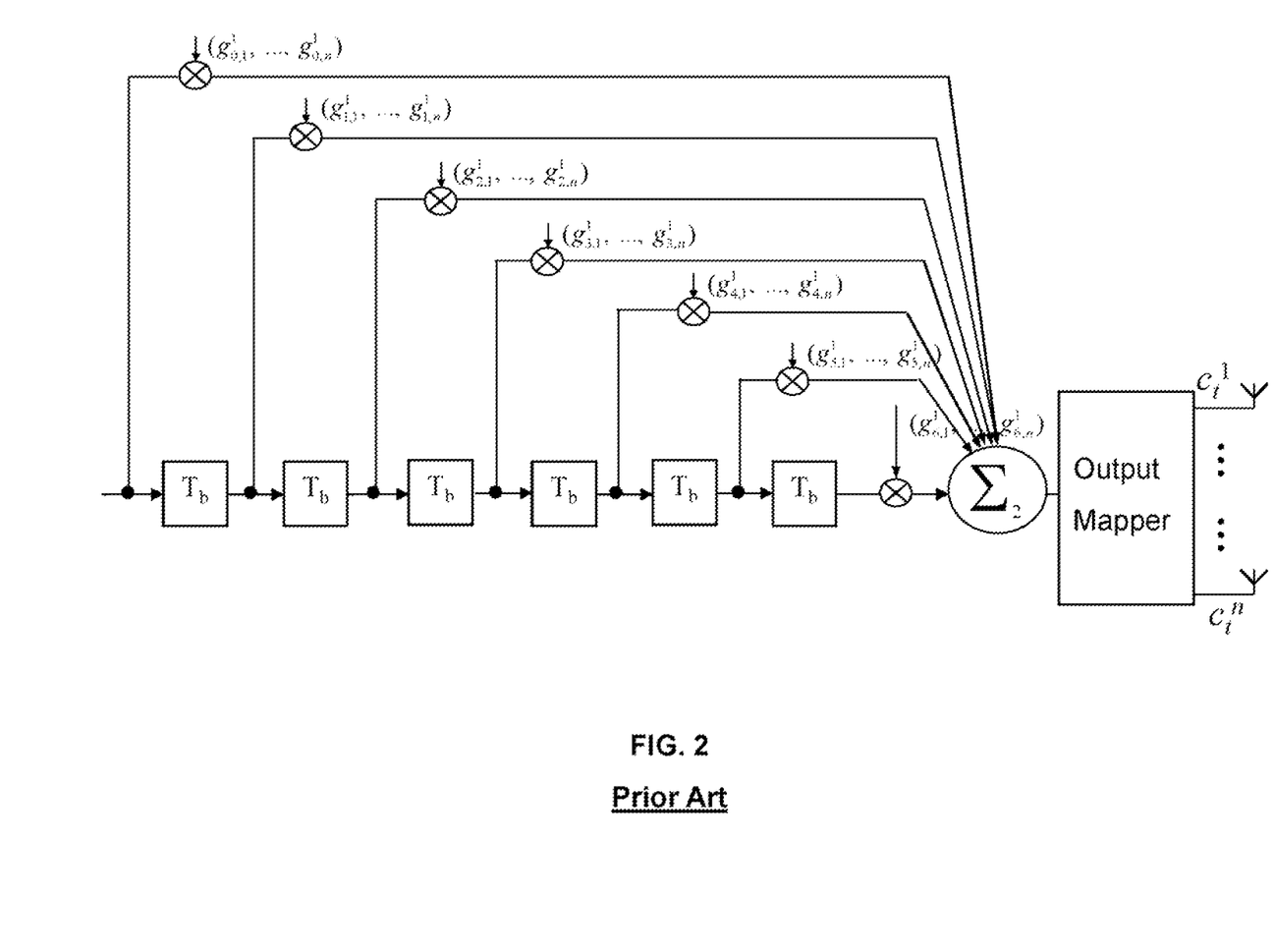
FIG. 2 is a graph of a conventional 64-state BPSK STTC encoder for n ($n \geq 2$) transmit antennas.
Figure 3:
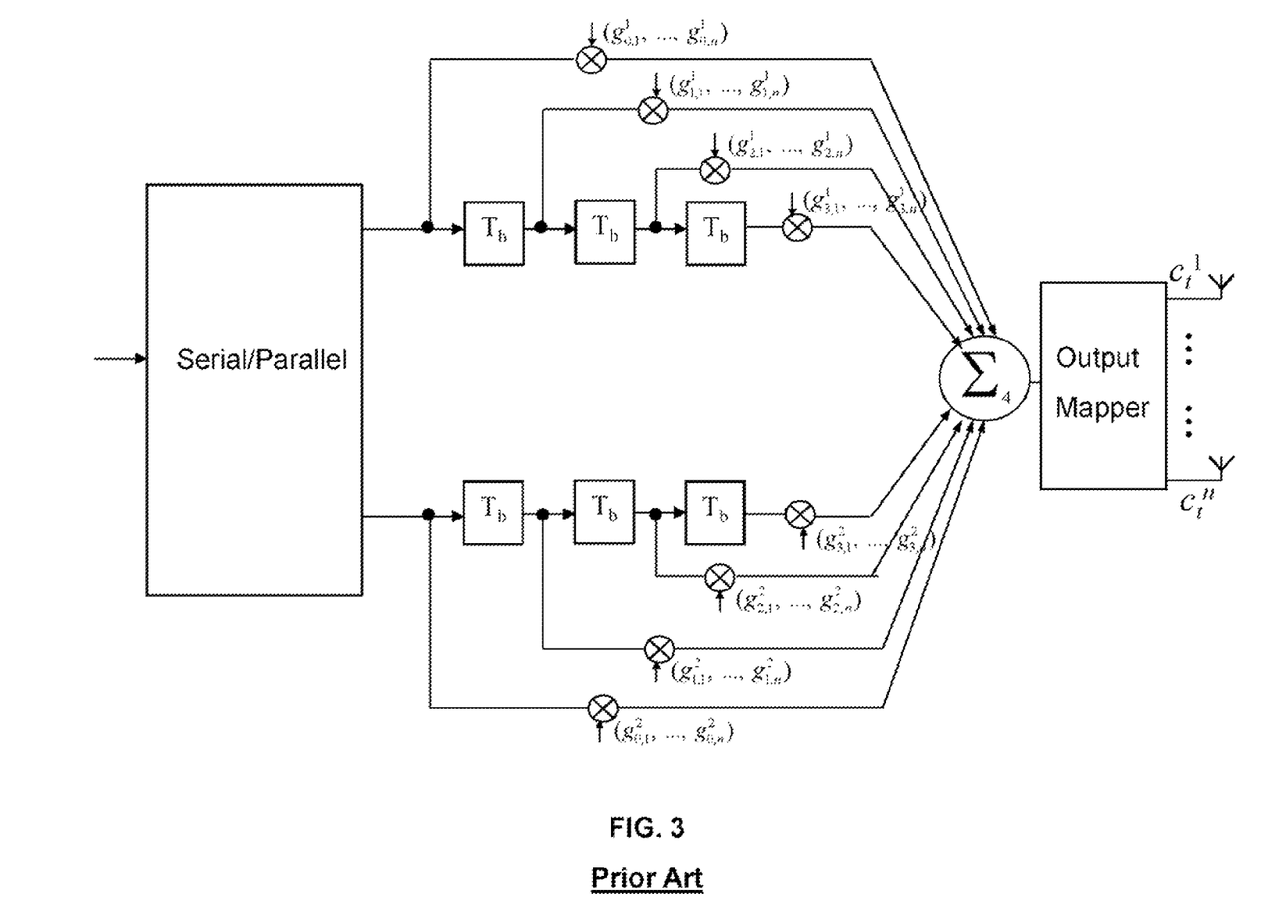
FIG. 3 is a graph of a conventional 64-state QPSK STTC encoder for n ($n \geq 2$) transmit antennas.

For STTC using PSK modulation, using the code with 64 trellis states as the example, the encoder structure for n-Tx BPSK STTC and n-Tx QPSK STTC are shown in FIGS. 2-3, respectively. In both figures, each shift register is a 1-bit (binary) register. For BPSK, the values of code generator weight $g_{w,i}^1$ (w=0, 1, . . . , 6; i=1, . . . , n) belong to {0, 1}, and the multiplier outputs are added modulo 2. For QPSK, there are two parallel encoder branches. The values of $g_{w,i}^u$ (u=1, 2; w=0, 1, . . . , 3; i=1, . . . , n) belong to {0, 1, 2, 3}, and the multiplier outputs are added modulo 4.

For STTC using QAM modulation, a generic design for n-Tx $2^{2p}$-QAM STTC (p is a positive integer) is known. A 16QAM STTC encoder is described by Liu et al., "A rank criterion for QAM space-time codes," IEEE Trans. on Inform. Theory, vol. 48, no. 12, pp. 3062-3079, December 2002.

A 16-QAM decoder is described by Wong et al., "Design of 16-QAM space-time trellis codes for quasi-static fading channels," Proc. of VTC 2004-Spring, pp. 880-883, Can 2004.

An n-Tx BPSK/QPSK encoder is described by Vucetic et al., "Space-Time Coding," West Sussex, England: John Wiley Sons, 2003.

Figure 4:
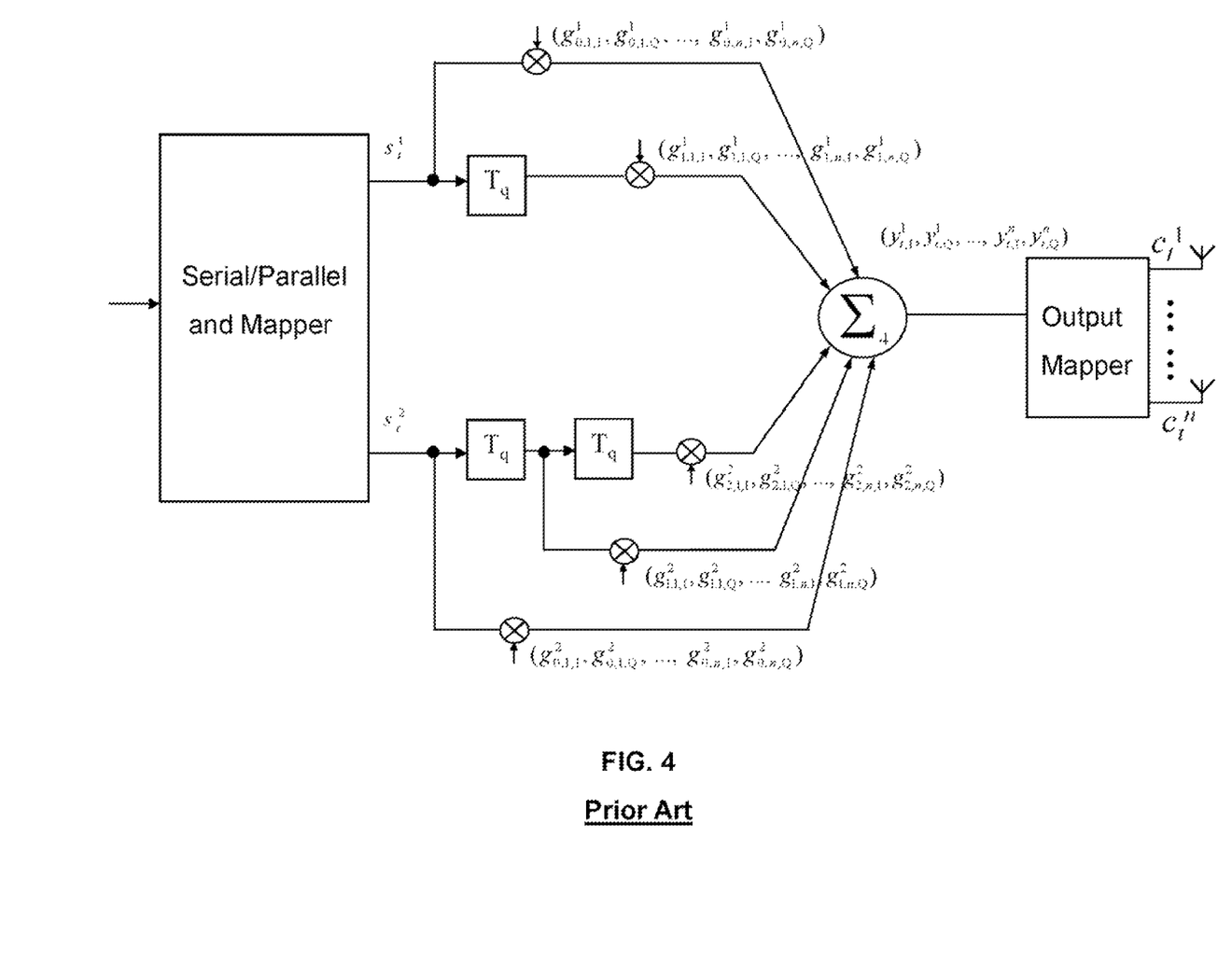
FIG. 4 is a graph of conventional 64-state 16QAM STTC encoder for n ($n \geq 2$) transmit antennas.
Figure 5:
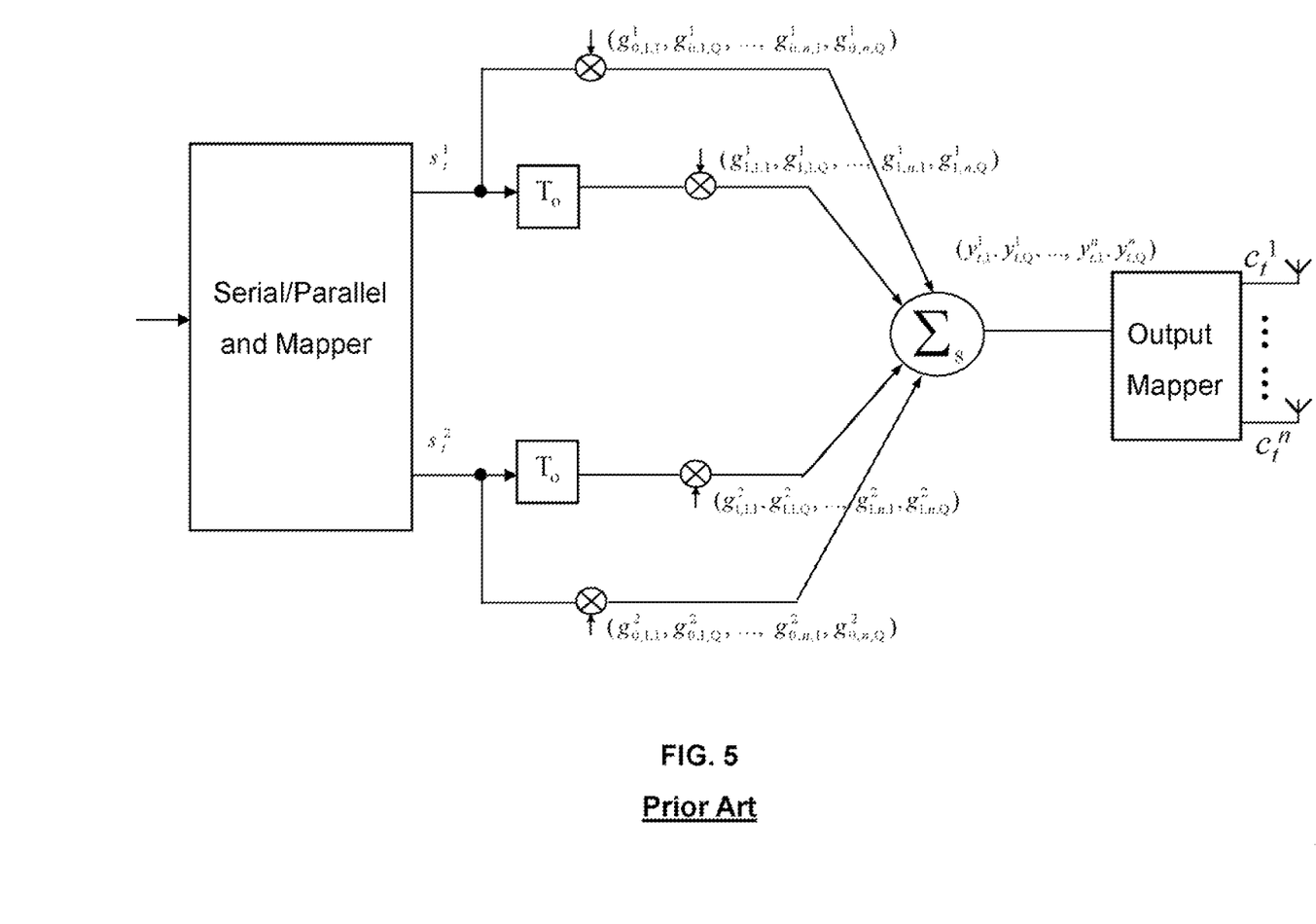
FIG. 5 is a graph of conventional 64-state 64QAM STTC encoder for n (n≧2) transmit antennas.

In some designs, at each time slot t, the input mapper converts k=2p serial information bits into two parallel symbol streams $s_t^1, s_t^2 \in Z_{2^p} = \{0, 1, \ldots, 2^p-1\}$, so that there are always two parallel encoder branches. Based on the symbols, the generator coefficients, and the state values, the encoder produce the outputs as $y_{t,I}^1, y_{t,Q}^1, \ldots, y_{t,I}^i, y_{t,Q}^i, \ldots, y_{t,I}^n, y_{t,Q}^n$. The output mapper takes the encoder outputs and converts them into $c_t = (c_t^1, c_t^2, \ldots, c_t^n)$, where $c_t^i = y_{t,I}^i + j\, y_{t,Q}^i$ for $i=1, \ldots, n$. After a translational mapping of $c_t^i$ ($i=1, \ldots, n$) to elements in the $2^{2p}$-QAM constellation, each of n coded $2^{2p}$-QAM symbols is sent by one of n transmit antennas. Using a code with 64 trellis states as an example, the encoder structures for n-Tx 16QAM STTC and n-Tx 64QAM STTC are shown in FIGS. 4-5.

For the 16QAM case, each shift register is a 2-bit (quaternary) register. The values of code generator parameters $g_{w,i,I}^1$, $g_{w,i,Q}^1$ (w=0, 1; i=1, \ldots, n), $g_{w,i,I}^2$, $g_{w,i,Q}^2$ (w=0, 1, 2; i=1, \ldots, n) belong to $Z_4 = \{0, 1, 2, 3\}$, and the multiplier outputs are added modulo 4. For the 64QAM case, each shift register is a 3-bit (octal) register, the values of $g_{w,i,I}^u$, $g_{w,i,Q}^u$ (u=1, 2; w=0, 1; i=1, \ldots, n) belong to $Z_8 = \{0, 1, \ldots, 7\}$, and the multiplier outputs are added modulo 8.

There exist STTC schemes which are robust to unpredictable variation of channel conditions, V. Tarokh et al., "Space-time codes for high data rate wireless communication: performance criteria in the presence of channel estimation errors, mobility, and multiple paths," IEEE Trans. on Commun., vol. 47, no. 2, pp. 199-207, February 1999.

As shown in FIG. 3, the general encoder structure for n-Tx QPSK STTC only has two parallel encoder branches. If the encoder structure for n-Tx 16QAM STTC is selected for an n-antenna transmitter using n-Tx QPSK/16QAM STTC, when switching the modulation constellation between n-Tx QPSK STTC and n-Tx 16QAM STTC, the hardware implementation requires extensive variations.

In addition, using n=2 as the example, it has been shown in the work by Wong et al., that the error performance of 16QAM STTC in the work by V. Tarokh et al., is worse.

SUMMARY OF THE INVENTION

The embodiments of the invention use n-Tx MPSK/MQAM STTC ($n \geq 2$) as a coded modulation constellation scheme for n-antenna WAVE transceivers.

To avoid significant change in the encoder structure of n-Tx STTC when the modulation constellation varies, the invention provides a unified n-Tx STTC encoder implementation for all of the modulation constellations specified in IEEE 802.11p standard, including BPSK, QPSK, 16QAM, and 64QAM. Thus, adaptive modulation can be enabled where the modulation constellation can be adapted to changing channel conditions. And the same encoder circuitry can be used to implement the encoder for each modulation constellation.

For a transmitter with a single antenna, the embodiments provide a pseudo-STTC that can achieve coding gain and/or time diversity gain with full rate. In the pseudo-STTC encoder, the single-antenna transmitter sends a linear combination of n coded MPSK/MQAM symbols generated from an n-Tx STTC during at each time slot.

By estimating n equivalent channel coefficients at the receiver, each of which is a multiplicity of the original single-antenna channel coefficient and a linear coefficient, the pseudo-STTC can use the same coherent decoding procedure as for n-Tx STTC. Besides giving a good choice of random linear coefficients, the embodiments of the invention also provide a specific design for optimizing deterministic linear coefficients.

To provide a flexible code rate, we perform duplication on the original full-rate pseudo-STTC. In particular, when an n-Tx STTC is used as the underlying code, for every n coded symbols, $c_t^1, \ldots, c_t^n$, we transmit q ($q \geq 2$) different versions of linear combination using q different sets of linear coefficients; this scheme is called q-duplicated pseudo-STTC.

Compared with decoding the full-rate pseudo-STTC, the decoder of q-duplicated pseudo-STTC only needs to do simple modifications on the calculation of the branch metric. As for the full-rate pseudo-STTC, besides giving a good choice of random linear coefficients, we also design the optimal deterministic linear coefficients by focusing on 2-duplicated pseudo-STTC, which uses 2-Tx STTC as the underlying code.

To unify the codec module used for single-antenna pseudo-STTC and n-Tx STTC ($n \geq 2$), for full-rate transmissions, each antenna element of the n-Tx transmitter also sends a linear combination of $c_t^1, \ldots, c_t^n$, generated from an n-Tx STTC. This kind of multi-antenna coded transmission is equivalent to conventional n-Tx STTC when, for antenna i ($i=1, \ldots, n$), setting the linear coefficient multiplied with $c_t^i$ as 1 and all the other linear coefficients as 0. For lower-rate transmissions, each antenna element of the n-Tx transmitter also sends q linear combinations of $c_t^1, \ldots, c_t^n$. For antenna i, the linear coefficients used for each of q linearly combined transmissions are the same and have the format of setting the linear coefficient multiplied with $c_t^i$ as 1 and all the others as 0. By doing so, antenna i ($i=1, \ldots, n$) actually performs q repeated transmissions for $c_t^i$. This is a result of applying our duplication concept to conventional full-rate n-Tx STTC transmissions.

The advantages of the full-rate/duplicated pseudo-STTC techniques are as follows.

We provide unified codec modules for both single- and multi-antenna transceivers. For either single- or multi-antenna configuration, we provide flexible code rate via duplicated approach. For single-antenna configuration, when compared with the IEEE 802.11p convolutional code and its punctured versions, under either symbol-level or much slower time-varying flat/frequency-selective fading channels, we achieve better or comparable error performance with the same or higher data rate and with almost the same codec complexity. Additionally, the scheme is robust to highly dynamic channel conditions resulting from non-negligible Doppler spread and delay spread as well as imperfect frequency offset compensation. For the first time, we enable single-antenna transmissions to achieve coding gain with full-rate transmission.

DETAILED DESCRIPTION OF THE PREFERRED EMBODIMENT

The embodiments of our invention provide space-time trellis codes (STTC) for MIMO coding in multi-antenna WAVE networks. This is based on the following two facts.

As a trellis coded modulation technique for multi-antenna transmission, the codec complexity of STTC is similar to single-antenna trellis codes, e.g., convolutional codes, which have the same number of trellis states as STTC.

We describe an unified n-Tx STTC encoder implementation for all of modulation constellations specified in the IEEE 802.11p standard, including BPSK, QPSK, 16QAM, and 64QAM.

We provide a novel full-rate/duplicated pseudo-STTC techniques for single-antenna configuration, which provides a unified codec modules for both single- and multi-antenna transceivers. We first describe the pseudo-STTC techniques under the context of a single-carrier single-antenna network, and then describe the application of the proposed coding techniques to an orthogonal frequency-division multiplexing (OFDM) single-antenna network, e.g., a WAVE network.

Unified STTC Encoder Implementation for BPSK, QPSK, 16QAM 64QAM

STTC is a multi-antenna trellis coded modulation technique. If the modulation constellation changes, then the implementation of a conventional n-Tx STTC encoder requires extensive changes. Thus, it is desirable to provide an encoder structure for each considered modulation properly and further organize an unified n-Tx STTC encoder which easily allows switching between used modulation constellation depending on an instantaneous channel condition.

Thus, we describe a unified n-Tx STTC encoder implementation for all of modulation options prescribed in the IEEE 802.11p standard by combining portions of conventional encoders in a most unusual way.

Figure 6:
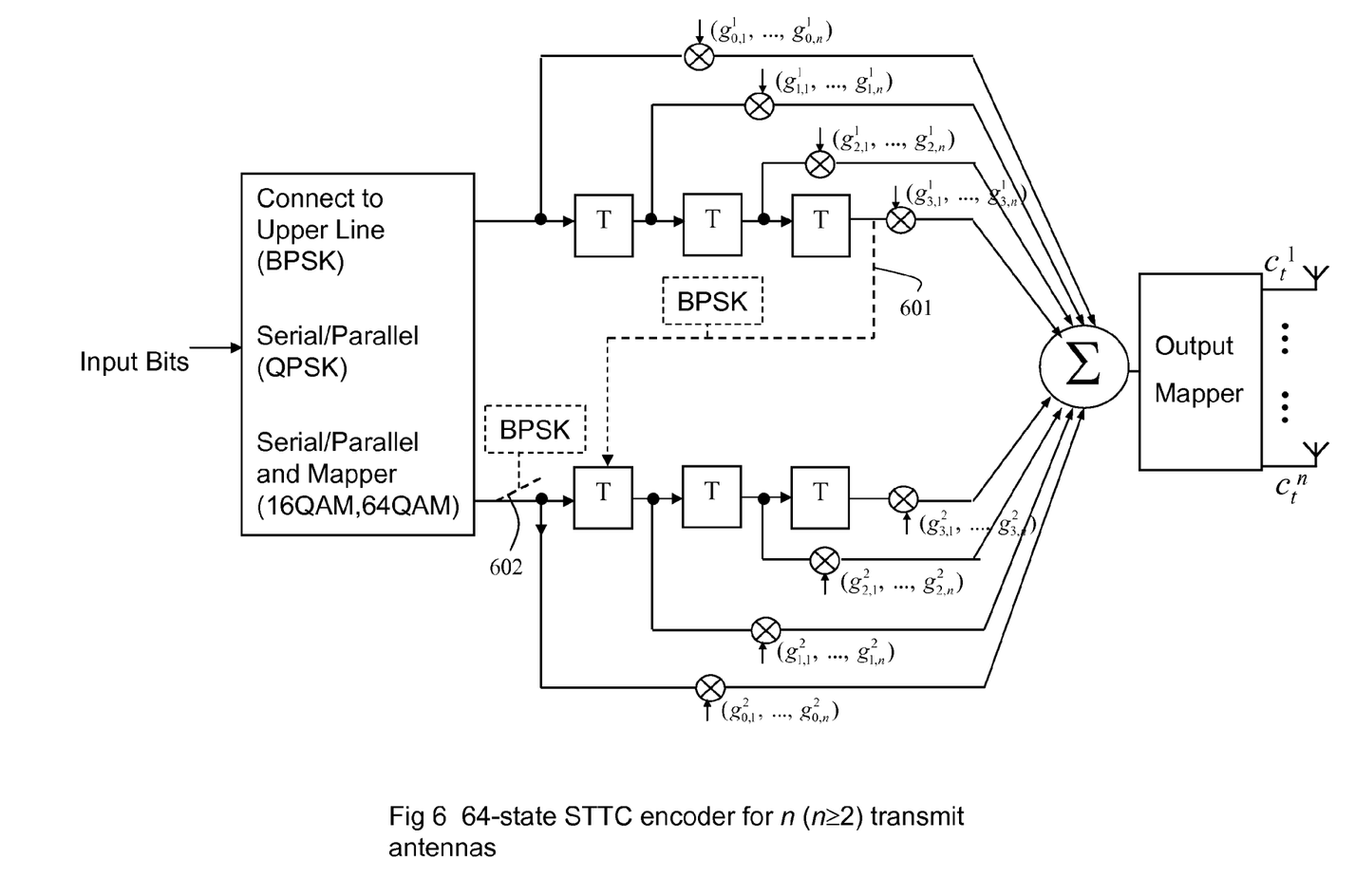
FIG. 6 is a graph of an unified n-Tx STTC encoder according to the invention for all of modulation constellations including BPSK, QPSK, 16QAM and 64QAM specified in the IEEE 802.11p standard.

Specifically, with the focus on n-Tx STTCs having 64 trellis states, the encoder structure is shown in FIG. 6.

We use switches to select dynamically select BPSK, QPSK, 16QAM, and 64QAM modulation constellations. The selection can dynamic and based on the instantaneous channel condition.

The encoder includes a serial to parallel (S/P) convertor 610 to convert an input stream of information bits 601 to first and second parallel bitstreams 602. The encoder includes a first branch of shift registers 621 and a second branch of shift registers 622. Each branch consists of three shift registers, and each shift register 605 has three bits. Code generating weights $g_w$ 611 are applied to the bits of the shift registers using multipliers 612 as described herein to produce a first set of encoded symbols 648, and a second set of encoded symbols.

The output encoded symbols 648-649 of the shift registers are combined 640, and an output mapper 650 maps the combined output to a plurality of antennas 651.

In the encoder 600, only for n-Tx BPSK STTC, second switch 606 is off so that the connection between the input data and the $1^{st}$ register at the second branch of shift registers 622 is disabled. Also for the n-Tx BPSK STTC, first switch 607 is on so that the line between the $3^{rd}$ register at the first branch of registers 621 and the $1^{st}$ register at the second branch of registers 622 is connected.

For QPSK, 16QAM and 64QAM, the second switch 606 is on so that the connection between the input data and the $1^{st}$ register at the second branch of registers 622 is enabled. The first switch 607 is off so that the line between the $3^{rd}$ register at the first branch of registers 621 and the $1^{st}$ register at the second branch of registers 622 is connected.

For BPSK or QPSK modulation constellation, out of the three bits in each shift registers 605, only one of the three bits are enabled.

For 16QAM modulation constellation, out of the three bits in each shift registers, only two of the three bits are enabled.

Only for 64QAM case, all of the three bits at each register are enabled.

For n-Tx BPSK STTC, the multiplier outputs are added 640 modulo 2; for n-Tx QPSK STTC and n-Tx 16QAM STTC, the multiplier outputs are added modulo 4; for n-Tx 64QAM STTC, the multiplier outputs are added modulo 8. The output of the adder are then mapped 650 to n BPSK/QPSK/16QAM/64QAM symbols $c^1_t, \ldots, c^n_t$. Then, $c^i_t$ is assigned to the $i^{th}$ (i=1, ..., n) transmit antenna 651 for transmission.

We now describe the setup of code generator parameters in the encoder 600 for the various modulation constellations.

BPSK STTC

For n-Tx BPSK STTC, the code generator parameters $g_{w,i}^1$ (w=0, 1, 2, 3; i=1, ..., n) are the same as those in FIG. 2, and $g_{w,i}^2$ (w=1, 2, 3; i=1, ..., n) are equal to $g_{w+3,i}^1$ in FIG. 2. All the other settings are the same as in FIG. 2.

QPSK STTC

For n-Tx QPSK STTC, all the settings, including the setting of $g_{w,i}^u$ (u=1, 2; w=0, 1, ..., 3; i=1, ..., n), are the same as in FIG. 3.

16QAM STTC

For n-Tx 16QAM STTC, $g_{w,i}^u$ denotes $[g_{w,i,I}^u, g_{w,i,Q}^u]$. For $g_{w,i}^1=[g_{w,i,I}^1, g_{w,i,Q}^1]$ (w=0, 1; i=1, ..., n), the elements $g_{w,i,I}^1, g_{w,i,Q}^1$ are the same as in FIG. 4. For $g_{w,i}^2=[g_{w,i,I}^2, g_{w,i,Q}^2]$ (w=1, 1, 2; i=1, ..., n), the elements $g_{w,i,I}^2, g_{w,i,Q}^2$ are the same as in FIG. 4. In this case, the second and third registers at the upper encoder branch the third register at the lower encoder branch are not needed; this is implemented by setting $g_{w,i}^1$ (w=2, 3; i=1, ..., n) and $g_{w,i}^2$ i (w=3; i=1, ..., n) as [0, 0] for 16QAM case. All the other setting are the same as in FIG. 4.

64QAM STTC

For n-Tx 64QAM STTC, $g_{w,i}^u$ also denotes $[g_{w,i,I}^u, g_{w,i,Q}^u]$ For $g_{w,i}^u=[g_{w,i,I}^u, g_{w,i,Q}^u]$ (u=1, 2; w=0, 1, ..., n), the elements $g_{w,i,I}^u, g_{w,i,Q}^u$ are the same as in FIG. 5. In this case, the second and third registers at either the upper or the lower encoder branch are not needed; this is implemented by setting $g_{w,i}^u$ (u=1, 2; w=2, 3; i=1, ..., n) as [0, 0] for 64QAM case. All the other setting are the same as in FIG. 5.

Full-Rate Pseudo-STTC for Single-Antenna Transmission

In a single-carrier single-antenna system, for the channel between a single antenna transmitter and receiver, the instantaneous channel coefficient at time t (i.e., the channel impulse response) is denoted as h(t). The multipath fading is considered as Rayleigh fading. Then, h(t) can be modeled as a zero-mean complex Gaussian random variable with unit variance per complex-dimension. The samples of h(t) are independent every other channel coherence time period.

Within a channel coherence time period, the samples of h(t) are) approximately invariant or they are closely dependent. If the channel coherence time is large and FEC is used, then a channel interleaver will be used to increase time diversity achieved by FEC. We assume a flat channel frequency response and perfect synchronization. At the receiver, the additive noise at time slot t, η(t), is modeled as a zero-mean complex Gaussian random variable with variance $N_0$ per complex-dimension. The samples of the noise η(t) are independent for every different t.

Figure 7:
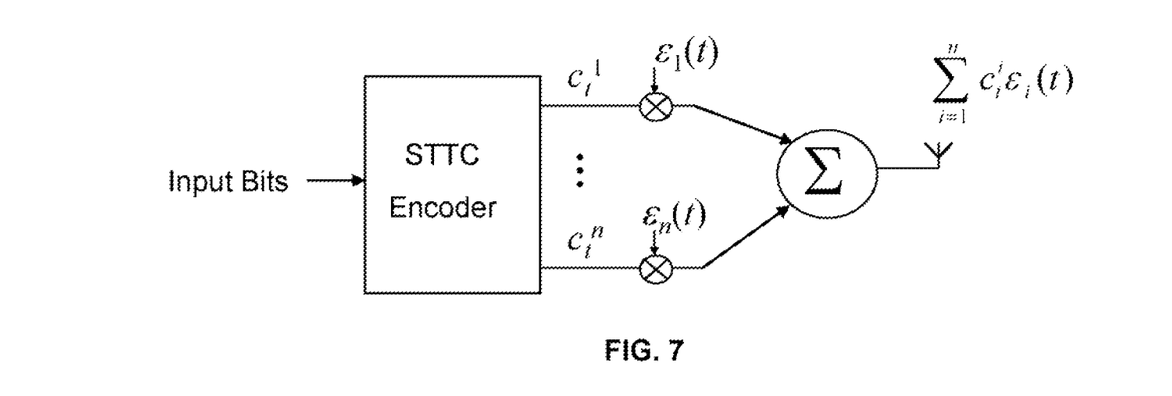
FIG. 7 is a graph of the single-antenna full-rate pseudo-STTC scheme according to the invention.

FIG. 7 shows a novel full-rate pseudo-STTC scheme for encoding input bits 701 for single-antenna 702. At each time slot, the single-antenna transmitter multiplies 705 each of n coded MPSK/MQAM output symbols with a complex number $\epsilon_i(t)$, and adds 710 the n resulting values together to form a linear combination of the output symbols, which are generated by encoding $k=\log_2 M$ information bits using an n-Tx STTC encoder 600.

The data rate of the pseudo-STTC scheme is k bits per channel use. The n linear coefficients used as the code generating weights for the combining at time slot t are denoted as $\epsilon_1(t), \epsilon_2(t), \ldots, \epsilon_n(t)$. At a single-antenna receiver, the received signal at time slot t is $$r(t) = h(t)\sum_{i=1}^{n} c_t^i \epsilon_i(t) + \eta(t) = \sum_{i=1}^{n} c_t^i \alpha_i(t) + \eta(t). \quad (1)$$

Based on the second equality in Eqn. (1), the pseudo-STTC scheme is equivalent to forming n "virtual antennas." Here, the equivalent instantaneous channel coefficient between the virtual antenna i (i=1, ..., n) and the single-antenna receiver is $\alpha_i(t)=\epsilon_i(t)h(t)$, and $c_t^i$ is transmitted by virtual antenna i. At the receiver, by estimating n equivalent channel coefficients $\alpha_i(t)$ (i=1, ..., n), the pseudo-STTC scheme can use the same coherent decoding algorithm as for n-Tx STTC with one receive antenna. Similar to conventional multi-antenna n-Tx STTC, in the pseudo-STTC scheme for a single antenna, the energy for each of the n coded symbols is $E_c=kE_b/n$. After we select linear coefficients so that $|\epsilon_i(t)|^2=1$ for every $i \in \{1, \ldots, n\}$, at each time slot t, the energy of transmitted linearly combined signal is ensured to be equal to $kE_b$.

For the single-antenna transmitter, transmit diversity gain cannot be achieved by the pseudo-STTC scheme. However, the coding gain can be achieved with full-rate transmissions. In addition, similar to conventional single-antenna FEC techniques, time diversity gain can also be achieved for time-varying fading. The order of achieved time diversity gain depends on the channel coherence time. With the channel interleaver, the time diversity gain can be increased.

Selection of Underlying n-Tx STTC

As we have described, without modifying the detection algorithm, a STTC designed for quasi-static flat fading channel can achieve at least the same end-to-end diversity benefit for other channel conditions. Thus, to make our pseudo-STTC robust to highly dynamic channel conditions resulting from non-negligible Doppler spread and delay spread, as well as imperfect compensation for frequency offset, the underlying n-Tx MPSK/MQAM STTC is selected as an n-Tx MPSK/MQAM STTC which is well-designed for quasi-static flat fading channel.

Linear Coefficient Setting for Full-Rate Pseudo-STTC

The values of linear coefficients $\epsilon_i(t)$ (i=1, ..., n) can be random or deterministic. For random linear coefficients, the uniform-phase randomization is a good choice. In this case, $\epsilon_i(t)=e^{j\theta_i}$ and $\theta_i$ (i=1, ..., n) are uniformly distributed over [0, 2π]. When $\epsilon_i(t)$ (i=1, ..., n) are set as random values, to decide how fast they change to use newly generated independent samples, let us first consider the following facts: (a) when the pseudo-STTC scheme is employed at the receiver, the channel estimation needs to be done by estimating the equivalent channel coefficients $\alpha_i(t)=\epsilon_i(t)h(t)$ (i=1, ..., n); (b) the original channel h(t) has independent variation every other channel coherence time period, more quick variation of $\epsilon_i(t)$ (i=1, ..., n) would not bring additional performance benefit; (c) generally, the channel estimation is performed by periodically inserting a bunch of pilot symbols into the transmitted data, and the insertion period is roughly set to the predicted value of channel coherence time.

Based on the above observations, to avoid increasing the burden of channel estimation without benefit, the random linear coefficients do not need to change every time slot; the coefficients can be set to use new samples only when a new bunch of pilot symbols are inserted. By doing so, roughly, the random linear coefficients change every other channel coherence time period.

If the n linear coefficients are set as deterministic values, then we even do not need to estimate the n equivalent channel coefficients, because $\alpha_i(t)=\epsilon_i(t)h(t)$ can be obtained by multiplying the estimated h(t) with the fixed values of $\epsilon_i(t)=\epsilon_i$ (i=1, ..., n). This is a big advantage because we do not need to do any modification for channel estimation processing. However, most deterministic linear coefficients result in worse error performance when compared with uniform-phase randomized linear coefficients. Thus, it is significant to design n deterministic linear coefficients that can provide similar or better error performance than using random coefficients, such as the uniform-phase randomization.

Optimization on Deterministic Linear Coefficients for Full-Rate Pseudo-STTC

By realizing (a) if the number of antennas for multi-antenna WAVE transceivers is n, the underlying code used by the single-antenna pseudo-STTC can be selected as n-Tx STTC, and (b) in the recent future, the multi-antenna WAVE devices would probably employ two antennas, in this embodiment of the invention, when we consider the specific pseudo-STTC scheme, the underlying STTC is chosen as 2-Tx STTC.

We optimize the deterministic linear coefficients for the pseudo-STTC using 2-Tx STTC as the underlying code. The general expressions for n=2 deterministic linear coefficients is $\epsilon_1(t)=\epsilon_1=e^{j\theta_1}$ and $\epsilon_2(t)=\epsilon_2=e^{j\theta_2}$, where $\theta_1$ and $\theta_2$ are two fixed phases. Based on analyzing the upper bound on pair-wise error probability (PEP), it is found that, if we want can use the derived upper bound on PEP, we can specify the underlying code as a 2-Tx STTC with a given modulation constellation.

We focus on the case using a 2-Tx QPSK STTC as the underlying code. Then, by utilizing the derived upper bound on the pair-wise error probability (PEP), we obtain the following results: if $|\theta_1-\theta_2|=\pi$, the maximum of PEP upper bound is minimized. However, this choice of deterministic linear coefficients still result in worse error performance than the uniform-phase randomized case. This is because the derived PEP upper bound is not that tight enough for effective optimization.

We believe that the optimal $|\theta_1-\theta_2|$ is equal to $\pi \pm \xi$, where $\xi$ is a small positive number. When verifying this conjecture via numerical simulations, we choose the underlying code as a "good" 2-Tx QPSK 64-state STTC designed for quasi-static flat fading channel, which has the same number of trellis states as the convolutional code used in 802.11p.

It is verified by simulations that, if two fixed phases $\theta_1$ and $\theta_2$ can satisfy $|\theta_1-\theta_2|=4\pi/5$, for the focused pseudo-STTC scheme, the deterministic linear coefficients $\epsilon_1(t)=\epsilon_1=e^{j\theta_1}$ and $\epsilon_2(t)=\epsilon_2=e^{j\theta_2}$ results in better error performance than the uniform-phase randomized case. The can exist another "good" choices for $\theta_i$ (i=1, 2), and the obtained optimized result is empirical. However, the theoretic analysis still give us a helpful indication. Actually, the indication about $|\theta_1-\theta_2|_{opt}=\pi\pm\xi$ helps us to avoid using exhaustive simulations to investigate the effect on error performance for infinite possible particular values of $\theta_1$ and $\theta_2$.

Unified Codec Module for Single- and Multi-Antenna Transceivers

For future WAVE transceivers equipped with n (n≧2) antennas, we have use STTC as the MIMO coding scheme. In order to unify the codec module used for single-antenna full-rate pseudo-STTC and conventional n-Tx STTC, each antenna of the n-Tx transmitter performs the same operation as the single-antenna transmitter employing the full-rate pseudo-STTC. That is, each of the n transmit antennas also sends a linear combination of n coded symbols generated by n-Tx STTC encoder. For this kind of multi-antenna coded transmission to be equivalent to conventional n-Tx STTC, we set the values of n linear coefficients to be some special fixed numbers. Specifically, for antenna i (i=1, . . . , n), the values of the linear coefficients are set as $\epsilon_i(t)=1$ and $\epsilon_j(t)=0$ for j≠i. By doing so, at each time slot t, $c_t^i$ is transmitted by antenna i (i=1, . . . , n), resulting in conventional n-Tx STTC transmissions.

Duplicated Pseudo-STTC for Single-Antenna Transmission

According to the IEEE 802.11p standard, the convolutional code with code rate of $R_c=1/2$ can be punctured to achieve a higher code rate, e.g., $R_c=3/4$, although with a worse error performance. To provide flexible code rate and better error performance, we to perform "duplication" on the full-rate pseudo-STTC.

Figure 8:
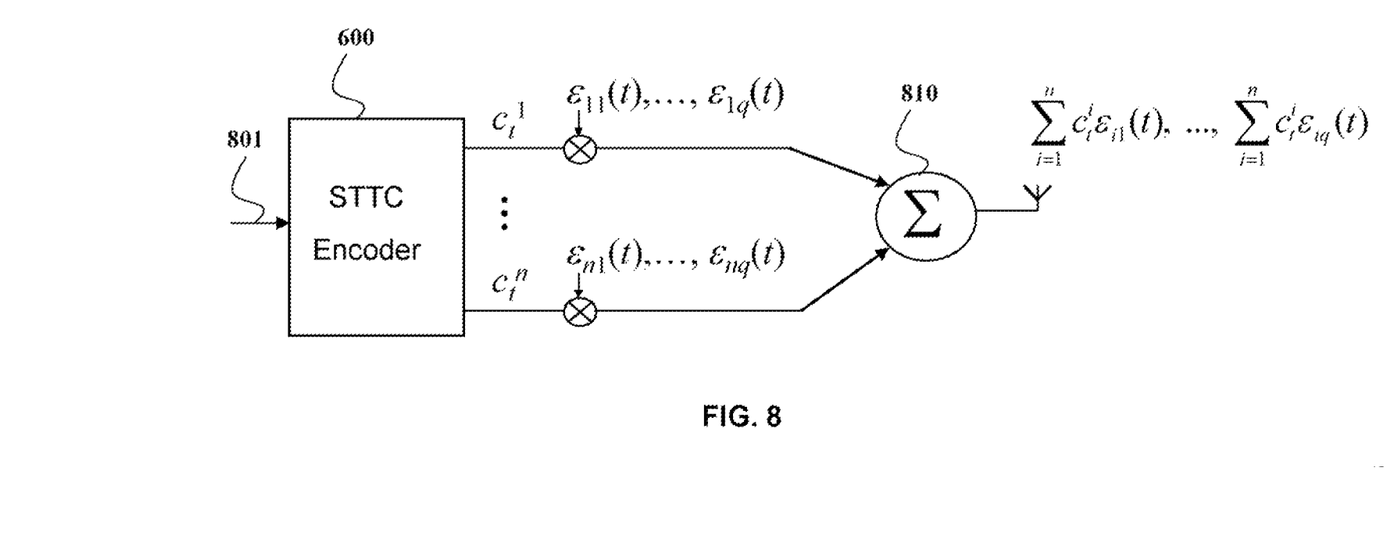
FIG. 8 is a graph of the single-antenna q-duplicated (q≧2) pseudo-STTC scheme according to the invention.

As shown in FIG. 8, the n-Tx STTC encoder 600 encodes k=$\log_2$ M information bits 801 into n coded MPSK/MQAM symbols. For every n coded symbols, the single-antenna transmitter sends q (q≧2) different versions of the linear combination 810 of these n coded symbols. The data rate of this duplicated scheme is k/q bits per channel.

For the full-rate pseudo-STTC, every linearly combined transmission corresponds to a unique time slot in the trellis. Thus, the time slot index for transmissions is the same as that for the trellis. However, for the q-duplicated pseudo-STTC, every q (q≧2) linearly combined transmissions correspond to a unique time slot in the trellis, so that the time slot index for transmissions is different from that for the trellis.

For the q-duplicated pseudo-STTC, we use t to denote the index of "trellis time slot", and we use t' to denote the index of "transmission time slot," If we let the starting time slot in the trellis be t=1 for each codeword, and let the starting time slot for transmitting a codeword (using the q-duplicated pseudo-STTC) be always normalized as t'=1, each trellis time slot corresponds to q transmission time slots, with the relationship of $t_1'=q(t-1)+1, \ldots, t'=q(t-1)+q=q\times t$.

Then, for n coded symbols $c_t^1, \ldots, c_t^n$ generated at trellis time slot t, the corresponding q sets of linear coefficients that are used for q different versions of linearly combined signals are denoted as $\epsilon_{1j}(t), \epsilon_{2j}(t), \ldots, \epsilon_{nj}(t)$ (j=1, . . . , q), and the instantaneous channel coefficients during the transmissions of q linearly combined signals are $h(t_j')$ (j=1, . . . , q). Accordingly, the q received signals at the single-antenna receiver are $$r(t_j') = h(t_j')\sum_{i=1}^{n} c_t^i \epsilon_{ij}(t) + \eta(t_j') = \sum_{i=1}^{n} c_t^i \alpha_{ij}(t) + \eta(t_j'), \quad (2)$$

$$j = 1, \ldots, q.$$

Based on the second equality in Eqn. (2), the q-duplicated pseudo-STTC scheme is equivalent to letting the $i^{th}$ "virtual antenna" perform q repeated transmissions of $c_t^i$, (i=1, . . . , n). Between the $i^{th}$ virtual antennas and the receiver, the equivalent instantaneous channel coefficients for q repeated transmissions are $\alpha_{ij}(t)=\epsilon_{ij}(t)h(t_j')$ (j=1, . . . , q). Compared with Viterbi decoding for the full-rate pseudo-STTC, the decoder of q-duplicated pseudo-STTC only modifies the branch metric.

In particular, the branch metric is the sum of q values, each of which is obtained by using one of the q received signals $r(t_j')$ (j=1, . . . , q) to do the same calculation of branch metric as for the full-rate pseudo-STTC.

For the q-duplicated pseudo-STTC scheme, the energy for each of the n coded symbols is $E_c=kE_b/n$. After we select linear coefficients so that $|\epsilon_{ij}(t)|^2=1/q$ for every i∈{1, . . . , n} and every j∈{1, . . . , q}, the total transmit energy of q duplicated linearly combined signals is ensured to be $kE_b$. That is to say, when all the q×n linear coefficients are non-zero, an inherent power normalization factor $1/\sqrt{q}$ can be included by each linear coefficient, regardless of the following description about setting appropriate values for linear coefficients to achieve good error performance.

Linear Coefficient Setting for Duplicated Pseudo-STTC

As for the full-rate pseudo-STTC, the values of linear coefficients $\epsilon_{ij}(t)$ (i=1, . . . , n; j=1, . . . , q) can be either random or deterministic. Using uniform-phase randomized linear coefficients is also a good choice for the q-duplicated pseudo-STTC. It is significant to design q×n deterministic linear coefficients that can provide similar or better error performance than using the uniform-phase randomized coefficients.

For the q-duplicated pseudo-STTC using n-Tx STTC as the underlying code, if we select q=n, and set the values of q×n=$n^2$ linear coefficient coefficients as $\epsilon_{ij}(t)=\epsilon_{ij}=1$ for i=j and $\epsilon_{ij}(t)=\epsilon_{ij}=0$ for i≠j (i=1, . . . , n; j=1, . . . , n), we obtain a special transmission scheme. In this scheme, the single-antenna transmitter separately sends each of n coded symbols $c_t^1, \ldots, c_t^n$, which are generated at trellis time slot t, over each of n transmission time slots $t_1', \ldots, t_n'$.

Optimization on Deterministic Linear Coefficients for Duplicated Pseudo-STTC

In the IEEE 802.11p standard, the specified modulation constellations include BPSK, QPSK, 16QAM, and 64QAM. Because, regardless of the used modulation constellation, the 2-duplicated pseudo-STTC achieves the same data rate as employing the convolutional code used in IEEE 802.11p. We optimize deterministic linear coefficients by focusing on 2-duplicated pseudo-STTC. In addition, as described before, in this invention, we focus on the case of using 2-Tx STTC as the underlying code.

For the 2-duplicated pseudo-STTC, which uses 2-Tx STTC as the underlying code, q×n=2×2=4 deterministic linear coefficients can be expressed as q=2 deterministic coefficient vectors $\epsilon_1=[\epsilon_{11},\epsilon_{21}]^T$ and $\epsilon_2=[\epsilon_{12},\epsilon_{22}]^T$. For every q=2 duplicated transmissions, the $i^{th}$ (i=1, 2) duplicated linearly combined signal uses $\epsilon_i$. Based on analyzing the upper bound on PEP, if $\epsilon_1$ and $\epsilon_2$ are two orthogonal vectors with $\epsilon_{ij}\neq 0$ (i=1, 2; j=1, 2), the maximum of PEP upper bound can be minimized. Verified by numerical simulations, this optimized deterministic linear coefficients can provide better error performance than the uniform-phase randomized case.

Unified Codec Module: Apply Duplication to n-Tx STTC Transmission

The duplication concept can also be used by conventional full-rate n-Tx STTC (n≧2) to achieve lower rate and larger redundancy. For multi-antenna transceivers employing n-Tx STTC, a straightforward duplication operation is to let the $i^{th}$ antenna perform q repeated transmissions for $c_t^i$ (i=1, ..., n). In this way, while the data rate becomes lower, additional time diversity gain can be achieved depending on channel coherence time, codeword length, and channel interleaver depth.

To unify the codec module used for both n-Tx q-duplicated STTC and single-antenna q-duplicated pseudo-STTC, let each antenna element of the n-Tx transmitter also send q linear combinations of $c_t^1, \ldots, c_t^n$. This is equivalent to n-Tx q-duplicated STTC when, for antenna i (i=1, ..., n), the linear coefficients used for each of q linearly combined transmissions are the same and have the format of setting the linear coefficient multiplied with $c_t^i$ as 1 and all the others as 0.

Apply Proposed Coding Schemes to OFDM-Based Single-Antenna Network

We describe our coding techniques in the context of an OFDM-based single-antenna network, such as WAVE network. We consider a single-antenna OFDM network with L subcarriers (e.g., L=52 in 802.11p). Among L subcarriers in one OFDM symbol, only $L_{CD}$ ($L_{CD}$<L) subcarriers are used to for coded data signals (e.g., $L_{CD}$=48 in 802.11p). If a packet is composed of V (V≧1) consecutive OFDM symbols, then one packet can totally load V×$L_{CD}$ coded data signals. When our coding technique is used as the FEC scheme, these coded data signals are obtained from encoding the data bits via employing the full-rate or q-duplicated pseudo-STTC, followed by interleaving. While the channel impulse response of the fading channel can vary within the duration of a packet, it is assumed to be effectively invariant within the duration of each OFDM symbol. Further, it is assumed that the maximum delay spread of the channel is smaller than the length of cyclic prefix (CP) and synchronization is perfectly done.

Figure 9:
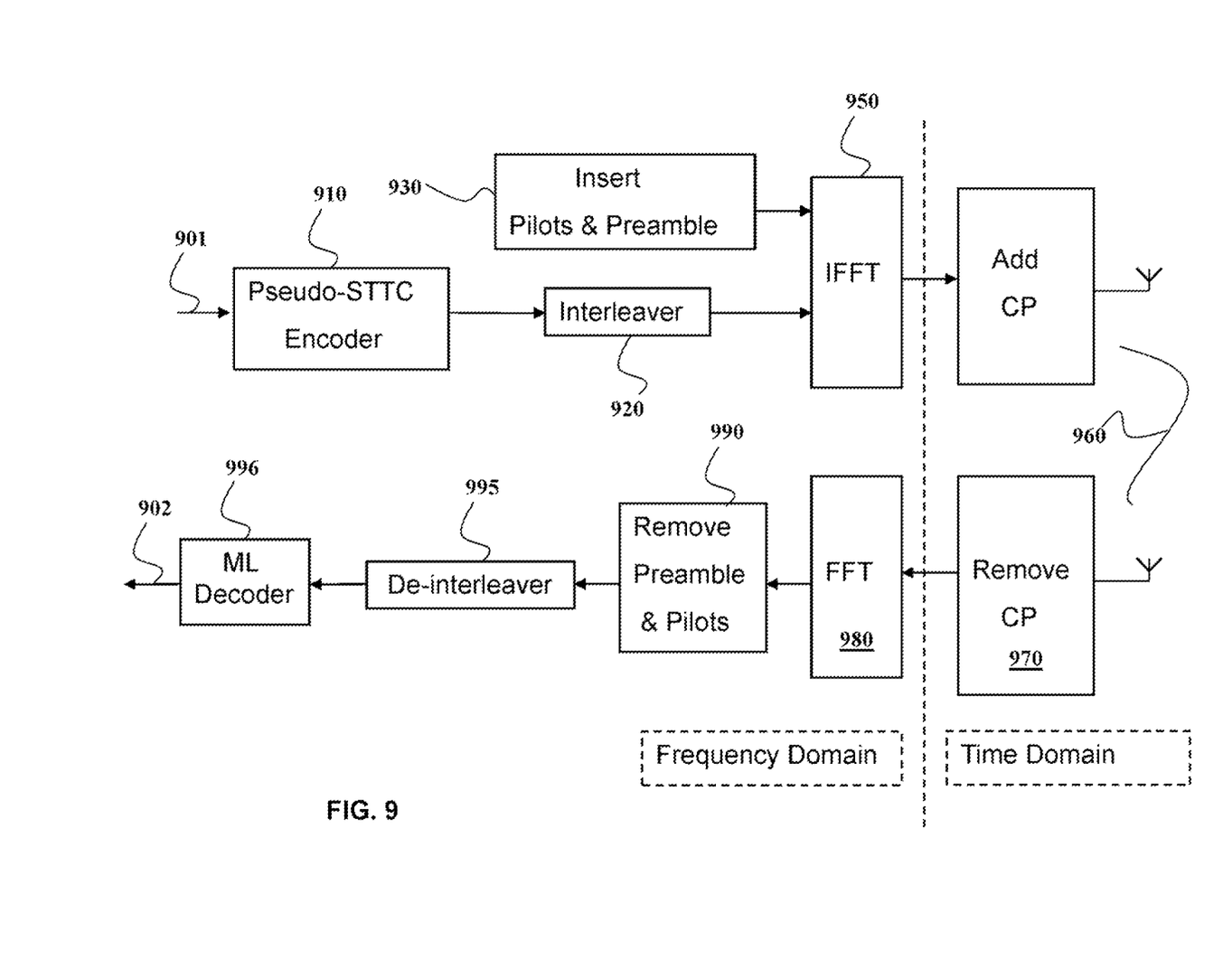
FIG. 9 is a block diagram of the functional stages at the PHY layer in single-antenna OFDM networks.

FIG. 9 shows stages at a PHY layer in a single-antenna OFDM network using our pseudo-STTC. At a transmitter, input bits 901 are input to our pseudo-STTC encoder 910, and encoded symbols are interleaved 920. Pilot symbols are inserted 930 and applied to an inverse fast Fourier transform (IFFT) 950 and passed through a channel 960. Before performing IFFT, within each packet, denote C[v, l] as the coded data signal assigned to subcarrier l (l=1, ..., L) at the v-th (v=1, ..., V) OFDM symbol in this packet. At the receiver, after performing FFT, the corresponding received version of C[v, l] can be expressed as $$R[v,l]=H[v,l]C[v,l]+Z[v,l], \quad (3)$$

In Eqn. (3), H[v, l] denotes the channel frequency response coefficients over subcarrier l (l=1, ..., L) at the v-th (v=1, ..., V) OFDM symbol in the considered packet, and Z[v, l] is zero-mean additive white Gaussian noise. For any given v, H[v, $l_1$] and H[v, $l_2$] ($l_1 \neq l_2$) are independent in ideal case; in practice, they can be correlated to a certain extent.

At a receiver, the CP is removed 970, and a FFT 980 is applied. The pilot symbols are removed 990, de-interleaved 995 and decoded 996 to obtain decisions 902.

When the q-duplicated pseudo-STTC is used, in order to achieve the maximum possible time diversity benefit provided by this coding scheme, it is required for every q duplicated coded signals to be assigned to q different subcarriers. In practical applications, q is a small value such as q=2; thus, it is easy to implement this kind of subcarrier allocation.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. An apparatus for encoding an input bitstream in a transmitter using a space-time trellis coding (STTC), comprising:
a convertor for converting input bits to a first and a second parallel bitstreams or to a single bitstream based on a type of modulation of the input bits;
a first branch of shift registers and a second branch of shift registers, each branch includes three shift registers;
a switch for selecting between a single and a parallel type of conversion, such that the single bitstream passes sequentially through both the first branch of shift registers and the second branch of shift registers connected in series, and the first and the second parallel bitstreams passes separately through corresponding the first and the second branch of shift registers; and
a processor for selecting weights of taps of the registers based on the type of modulation.

2. The apparatus of claim 1, wherein the type of modulation is selected from a group consisting of a binary phase shift keying (BPSK), a quadrature phase shift keying (QPSK), a 16 quadrature amplitude modulation (16QAM), and a 64 quadrature amplitude modulation (64QAM).

* * * * *